(12) United States Patent
Linton et al.

(10) Patent No.: US 11,709,867 B2
(45) Date of Patent: Jul. 25, 2023

(54) CATEGORIZATION OF DOCUMENT CONTENT BASED ON ENTITY RELATIONSHIPS

(71) Applicant: International Business Machines Corporation, Armonk, NY (US)

(72) Inventors: Jeb R. Linton, Manassas, VA (US); Rhonda L. Childress, Austin, TX (US); George E. Stark, Lakeway, TX (US); Charles Palmer, Hanover, NH (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 15/823,736

(22) Filed: Nov. 28, 2017

(65) Prior Publication Data

US 2019/0163804 A1 May 30, 2019

(51) Int. Cl.
*G06F 16/28* (2019.01)
*G06F 16/93* (2019.01)
*G06F 16/951* (2019.01)
*G06F 16/35* (2019.01)

(52) U.S. Cl.
CPC .......... *G06F 16/285* (2019.01); *G06F 16/288* (2019.01); *G06F 16/353* (2019.01); *G06F 16/93* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 7,249,380 B2* | 7/2007 | Yang | G06Q 30/0185 726/25 |
| 7,571,145 B2 | 8/2009 | Boies et al. | |
| 3,108,410 A1 | 1/2012 | Strosaker et al. | |
| 11,379,538 B1* | 7/2022 | McClusky | G06F 16/3346 |
| 2005/0138056 A1* | 6/2005 | Stefik | G06F 16/3328 707/999.102 |
| 2005/0289199 A1 | 12/2005 | Aphinyanaphongs et al. | |
| 2006/0004716 A1* | 1/2006 | Hurst-Hiller | G06F 16/9535 |
| 2009/0216563 A1 | 8/2009 | Sandoval et al. | |
| 2011/0313852 A1* | 12/2011 | Kon | G06Q 30/0256 707/706 |
| 2016/0335537 A1* | 11/2016 | Spagnola | G06N 3/08 |

* cited by examiner

*Primary Examiner* — Alford W Kindred
*Assistant Examiner* — Cao D Vuong
(74) *Attorney, Agent, or Firm* — Peter J. Edwards

(57) ABSTRACT

A document of written content may be obtained. The document may be a candidate for inclusion in a corpus. A first entity associated with the document may be identified. A first discrete entity associated with the first entity may be identified. The relationship associated with the first entity and the first discrete entity may be analyzed. Based on the analyzing, a likelihood that the document contains content that would be detrimental for inclusion in the corpus may be determined.

17 Claims, 6 Drawing Sheets

CATEGORIZATION OF DOCUMENT CONTENT BASED ON ENTITY RELATIONSHIPS

BACKGROUND

The present disclosure relates to document content analysis, and more specifically, to detecting documents likely to contain content detrimental to a corpus.

Several types of neural networks operate or are trained using large corpora of documents. These documents are typically categorized by analysis of the content of the documents. The ability of this content analysis to detect content that may negatively affect the processing of the corpus by a neural network is limited.

SUMMARY

Some embodiments of the present disclosure can be illustrated by a method, system, and computer program product for determining whether a document would be detrimental for inclusion in a corpus. A document of written content may be obtained. The document may be a candidate for inclusion in a corpus. A first entity associated with the document may be identified, and a first discrete entity associated with the first entity may be identified. The relationship between the first entity and the first discrete entity may be analyzed. A likelihood that the document contains content that would be detrimental for inclusion in the corpus may be determined based on the analysis of the relationship.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
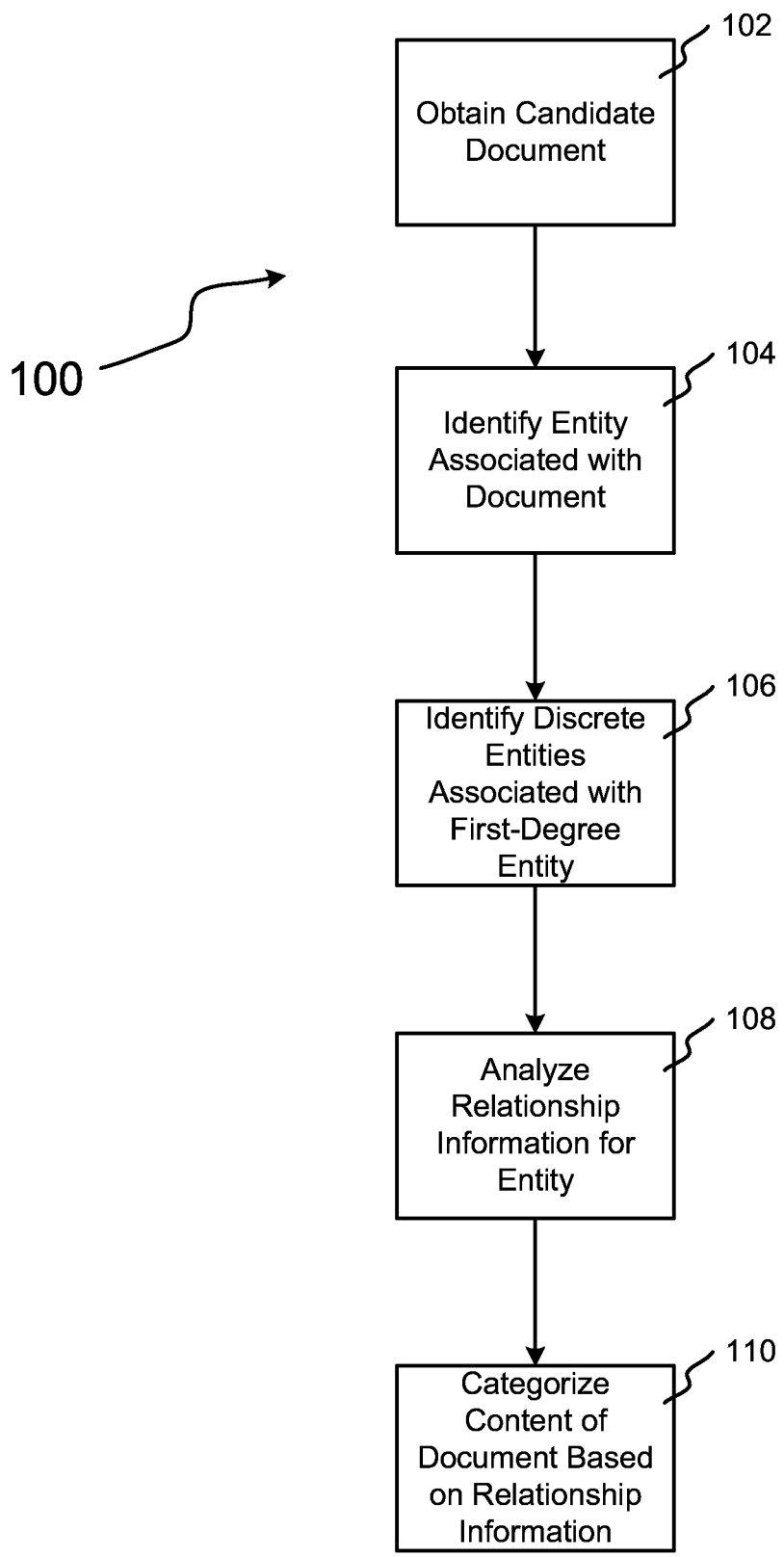
FIG. 1 depicts an example method of automatically categorizing content based on entity-relationship information, in accordance with embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to document content analysis, more particular aspects relate to detecting documents likely to contain content detrimental to a corpus. While the present disclosure is not necessarily limited to such applications, various aspects of the disclosure may be appreciated through a discussion of various examples using this context.

Some cognitive computing systems operate by processing large amounts of content (e.g., periodical articles, blog posts) and reaching conclusions based on that processing. The large amount of content that is processed by a cognitive computing system is often referred to as a "corpus." Some cognitive computing systems may process corpora in which each document in the corpus (e.g., each blog post) is selected for the system by a human reviewer. However, some cognitive computing systems, particularly those based on highly capable neural networks, are capable of processing corpora that are quite large. Selecting content for these cognitive computing systems utilizing human reviewers is significantly time consuming.

Thus, some cognitive computing systems have been designed to automatically obtain a corpus prior to processing it. These cognitive computing systems may obtain a corpus by searching through a large supply of documents, such as a document repository or the Internet, for documents that may be relevant to the processing being performed by these systems. This searching may sometimes be referred to as "crawling" (e.g., crawling the Internet for documents). Documents that may be relevant are then added to the corpus. This process may be referred to as building a corpus. By automatically crawling for content and building a corpus with that crawled content, cognitive computing systems often can obtain a large corpus far faster and by utilizing far fewer resources than would be possible with human review.

However, while cognitive computing systems may be capable of crawling through large amounts of documents far faster than human reviewers, cognitive computing systems may be less able than human reviewers to review a potential document to be added to a corpus (also referred to as a "candidate document"; i.e., a document that is a candidate for entry into a corpus) and identify objectionable content. The nature of objectionable content may vary depending on the type of cognitive system for which a corpus is being built, but it may oftentimes be content that is actually somehow related to the intended topic of the corpus, but that inclusion of which in a corpus may alter the processing of that corpus, or the conclusion based on that processing, in an undesirable way. In other words, objectionable content may be any content in a document that, for reasons that may not be related to that document's relevance to a corpus, if included in the corpus, would have a detrimental effect on the corpus.

One example of how objectionable content may be harmful occurs when attempting to train a neural network to analyze or produce unbiased commentary on a particular topic. For example, a neural network may be trained to write weekly articles about a particular sports team. That neural network may be designed to crawl the Internet for recent documents that are relevant to that sport and write an article on the team's recent activity. However, if the sports team is involved in a bitter rivalry with another sports team, many of the documents available on the Internet may be very biased in one direction or another depending on whether the particular author of a particular document supports one of the two teams. Even further, many documents written by biased authors may include sentimentally negative, even malicious, commentary that could be reviewed and learned by the neural network. The neural network may then produce a biased, malicious article that many readers find offensive. In this example, each document selected for inclusion in the corpus may have been highly relevant to the processing to be performed by the cognitive system. However, relevant documents with objectionable content may make the product of the cognitive system unusable.

Human reviewers are typically able to identify objectionable content in a document with relative ease. For example, human reviewers for a particular topic may be able to spot bias based on a subjective analysis of the content in a candidate document as compared to their own understanding of an unbiased presentation of the candidate document's subject matter. Human reviewers may also identify offensive or malicious content or content that is otherwise inappropriate for a particular corpus by subjectively comparing the content of the candidate document to the reviewer's inherent understanding of social norms, either generally or for that particular corpus. However, cognitive systems lack the ability to subjectively analyze the content in a candidate document, and do not contain an inherent understanding of generally acceptable social norms or social norms that are specifically applicable to a certain topic or type of content. For at least this reason, typical cognitive systems are far less able to identify objectionable content upon a review of that content than are human reviewers.

For that reason, corpora selected by cognitive systems that crawl a large supply of candidate documents and select those documents based on the content therein are at a higher risk of being undesirably affected by objectionable content than are corpora selected by human reviewers. Further, neural networks trained using those corpora may incorporate that objectionable content into the formation of the neural network, potentially creating a network with biased or offensive tendencies in its analysis. Finally, neural networks that process corpora that contain large amounts of objectionable content may produce decisions that are negatively affected by the objectionable content, even if those neural networks were trained using corpora selected by human reviewers. These decisions may result in work product that many viewers find biased or offensive, even though the neural network may not have been inherently biased or offensive.

However, as discussed, some cognitive computing systems require corpora, for training purposes or actual decision-making purposes, that are too large to be built by human reviewers in a reasonable period of time or at a reasonable cost. For at least this reason, a cognitive system that is better able to identify objectionable content when building a corpus is required.

Some embodiments of this disclosure may improve upon automated building of corpora by incorporating by analyzing entity relationships associated with that document. These entity relationships may indicate likely attributes of an entity associated with the document (e.g., a source of the document, such as the document author, document owner, or owner of a website on which the document is hosted). In some embodiments these likely attributes may then be attributed to the document to categorize the content with more specificity than a cognitive computing system may be able to based on the content of the document alone. In some embodiments, this categorization may be useful to identify when a document is likely to contain objectionable content.

For example, a cognitive computing system may analyze a scientific paper to determine whether to include the paper in a corpus that is intended for training a neural network. The scientific paper includes a series of names on the cover page. The cognitive computing system determines that those names are the authors of the paper. Further, if the paper contains the phrase "Not Fake Journal of Unbiased Science," the cognitive computing system determines that the paper was released by the "Not Fake Journal of Unbiased Science."

A content-analysis system may analyze this paper and decide that the document does not contain objectionable content. This may be based, in part, on the document fitting the appearance of a peer-reviewed article and being released by a journal. Natural-language processing may even be performed on the title of the journal, which may lead the content-analysis system to determine that the paper was released by a journal that is not only not fake, but that reports on unbiased science.

However, in this example, content analysis may be insufficient to accurately determine whether the paper contains objectionable content. If entity-relationship analysis were performed on the entities associated with the paper, however, an accurate classification would be more likely. For example, the name of each author on the cover page may be identified as an entity, as may be the journal name. If further entities associated with the authors are identified, it may be determined that a high majority of those further entities are associated with a company that is known for lobbying politicians with biased research. It may also be determined that the few entities that are scientists and are associated with the authors write highly negatively regarding the quality of the research performed by the authors of the paper. To continue the example, further entities associated with the journal are identified, and it may be determined that the "Not Fake Journal of Unbiased Science" has been criticized by many other entities (e.g., other journals) as being a fake scientific journal that releases biased reports.

In this example, the entity-relationship analysis may make it clear that the paper is likely to contain biased information, and should probably not be included in a corpus of documents for that reason. Further, a system that attempts to identify the likelihood that a document contains objectionable content based on content analysis of that document alone may not be capable of detecting the likelihood of objectionable content. This may, in turn, cause the system to select documents with objectionable content for inclusion in a corpus, which may make training using that corpus counterproductive.

Further, in the previous example, and in some other examples described herein, the analysis of relationships and the resulting characterization of a candidate document is discussed as including a logical analysis of statements made by one entity and attributing the analyzed meaning of those statements to the of another entity (e.g., a first author describing a second author as having a poor reputation may be analyzed and the second author may, as a result, be characterized as having a poor reputation). For example, in some embodiments whether a candidate document is likely to contain offensive content may include analyzing the language used to describe the author of the content from a wide variety of sources. Some of those sources may negatively criticize the author, whereas other sources may praise the author. Further, some of the sources themselves may be negatively criticized, which may be attributed to their criticisms of the author (e.g., their negative criticism may have less effect on the analyzed categorization of the author, no effect on the analyzed categorization of the author or a positive effect on the analyzed characterization of the author). Some embodiments may thus involve analyzing (e.g., through natural language processing and sentiment analysis) a large web of relationships between entities and statements made by those entities about other entities to ultimately determine how likely a particular entity may be to produce a document with objectionable content, and attribute that likelihood to a document that is associated with (e.g., owned by) that entity and that is being considered for inclusion in a corpus.

However, in other embodiments, an analysis of relationships may be based far more on pattern analysis than a logical analysis of the meaning of documents associated with entities. For example, rather than logically analyze the meaning of such documents (e.g., to attribute their meaning to relationships between the associated entities and the categorization of those entities as likely or unlikely to produce objectionable content), the documents and entity-relationship lists, among other potential inputs, associated with a particular document may be prepared for analysis by a neural network trained to recognize patterns among the documents and entity-relationship lists. In some embodiments "preparing" for analysis by a neural network may include vectorizing the documents and entity-relationship lists. In other embodiments it may include performing some natural-language processing on the documents and entity lists and vectorizing the processed data.

In some of these embodiments, the neural network may be trained to recognize patterns among the documents, entity-relationship lists, and other data (or the processed forms of those inputs) associated with a particular candidate document. The neural network may be trained to then match those recognized patterns to patterns associated with one or more documents that the neural network has been trained to categorize as, for example, likely or not likely to contain objectionable content. If one-or-more documents had been categorized as unlikely to contain objectionable content, the neural network may also categorize the particular candidate document as unlikely to contain objectionable content. In this way, the neural network may be capable of accurately categorizing a particular candidate document without performing the analysis of the meaning of any documents with which the particular candidate document is associated.

As a further example, with sufficient relationship data, no further data may be necessary for the neural network to categorize a particular document. In other words, with sufficient information related to the entities with whom (and with which) a particular document is associated (and, in some instances, the entities with whom those entities are associated, and so on), a neural network may be capable of categorizing a document based only on the relationships of the entities (i.e., not based on the content of any documents attributed to those entities or, particularly, what those entities suggest about each other). However, in other embodiments, adding additional data types may increase the speed and accuracy with which the neural network is capable of categorizing the particular document.

FIG. 1 illustrates an example method 100 of automatically categorizing content based on relationship information associated with an entity that is associated with that content. In block 102, a candidate document is obtained by a cognitive computing system. For the purposes of this discussion, a "document" may be, for example, a blog post, a social-media post, a periodical article, an academic paper, or other items containing written content. In some embodiments any written material may be considered a "document." In other embodiments some requirements may need to be met by a document in order for the cognitive computing system to obtain the document.

For example, in some embodiments a cognitive computing system may only obtain documents with written material that is at least of a certain length (e.g., a certain number of words). In other embodiments only content related to certain topics (e.g., topics related to the analysis that is to be performed by the system that will be processing the corpus) may be obtained. In yet other embodiments, only content that meets certain formality requirements (e.g., content that appears to contain a title, a date, and is organized into paragraphs) may be obtained. By requiring that documents meet certain preliminary requirements (such as length and topic-relevance requirements), a cognitive computing system may improve the chances that all documents considered for inclusion in a corpus (i.e., all "candidate documents") may be relevant to a particular topic or use.

In some embodiments the content may be obtained in block 102 by a cognitive computing system by crawling the Internet or a document repository for written material that meets the applicable requirements. In other embodiments, such as when training a neural network to perform a method similar to method 100, a candidate document may be provided to the cognitive computing system (e.g., by a human reviewer or by another cognitive computing system).

In block 104, an entity that is associated with the candidate document is identified by the cognitive computing system. An "entity" may vary based on the type of candidate document, but may include the author of content of the candidate document, the publisher of the candidate document, the owner of the website that is hosting the candidate document, or the person or organization that is sponsoring (e.g., posting, reposting, forwarding, reblogging, sharing, or otherwise providing) the candidate document while potentially being otherwise unassociated with the document. In some instances only one entity may be associated with a candidate document, whereas in other instances multiple entities may be associated with a candidate document. For ease of illustration, an entity associated with a candidate document that is being categorized may be referred to herein as a first-degree entity.

In some embodiments first-degree entity information may be obtained by analyzing the unstructured data associated with the candidate document (e.g., the candidate document content). For example, an entity associated with a candidate document may sometimes be identified by performing natural language processing on the candidate document or web page on which the candidate document is hosted. For example, a cognitive computing system that is analyzing an article posted on a webpage with the words "Inoffensive Newspaper, LLC" at the bottom of the page may conclude that "Inoffensive Newspaper" is the name of a newspaper that owns the article.

In some embodiments first-degree entity information may be obtained by analyzing structured data associated with the candidate document (e.g., metadata attached to the candidate document). For example, the HTML data of the previously discussed webpage on which "Inoffensive Newspaper, LLC" was located may contain a field that is titled "domain owner," and "domain owner" may be populated with "Inoffensive Newspaper, LLC." Further, the metadata of the file of the previously discussed scientific paper may contain a field that is titled "Credible Scientist Authors," and that is populated with the same series of names found on the cover page of the paper.

In block 106, the cognitive computer system identifies other entities that may be associated with the first-degree entity identified in block 104. In some embodiments, for example, the cognitive computer system may crawl the Internet or a document repository for references of the first-degree entity, and identify entities associated with references of the first-degree entity. These "other entities" may be referred to herein as "discrete" entities because they may have no association with the candidate document or the first-degree entity except through other documents and entities. For example, in some embodiments these discrete entities may actually be included in the content of a candidate document, or may be directly associated with the first-degree entity (e.g., the discrete entity may be the employer of the first-degree entity). However, in other instances the discrete entities may be associated with the candidate document only through the first degree entity, and only associated with the first degree entity through another discrete entity (e.g., a first discrete entity may release commentary on a first-degree entity, and a second discrete entity may release commentary on the first discrete entity, but the second discrete entity may not share a direct association with the first-degree entity). In some embodiments, documents that contain references to the first-degree entity may be referred to as second-degree documents, and the discrete entities associated with the first-degree entity in the second-degree documents may be referred to as second-degree entities. In some embodiments, references to the first-degree entity may occur in a document for which the second-degree entity would be considered a first-degree entity if that document were being analyzed for inclusion in a corpus (e.g., a blog article written by the second-degree entity that comments on the first-degree entity). In other embodiments references to a first-degree entity may occur in a document that also references a second-degree entity (e.g., a document that compares the first-degree entity and second-degree entity, or a document that lists their relationship).

In some embodiments other discrete entities associated with these second-degree entities may also be identified in block 106, resulting in third-degree entities. For example, a second-degree entity may be referenced in an article that provides commentary on the second-degree entity. The author of this article may be considered a third-degree entity. In some embodiments the determination of a discrete entity's degree may be based on the perspective. For example, an article may provide commentary on both a first-degree entity and another discrete entity. The author of that article may either be considered a second-degree entity or a third-degree entity based on whether the author is analyzed as the author of a document that mentioned the first-degree entity (resulting in the author being considered a second-degree entity) or as the author of an article that mentioned the "another discrete entity" (resulting in the author being considered a third-degree entity and the "another discrete entity" being considered a second-degree entity).

This entity-identification process may be repeated until the total dataset of entities is large enough for accurate relationship analysis. The number of entities required in the dataset may vary based upon the implementation. For example, in disciplines in which in which entities are highly interrelated, fewer entities may be required in order to gain a representative sample of entity relationships. Further, in embodiments in which entities frequently provide commentary related to each other (e.g., in second-degree documents), that commentary may enable the system to accurately analyze entity relationships with fewer total entities. For example, in some embodiments a dataset of 25 entities may be large enough, whereas in other embodiments 10,000 entities may be required for accurate relationship analysis.

In block 108, entity-relationship information of the entities identified in blocks 106 and 108 is analyzed. In some embodiments, this may include plotting each entity in a coordinate space (e.g., a Cartesian or Euclidean coordinate space), wherein the position of each entity in the space provides information regarding that entity's relationship with other entities. The resulting plot of entities may be referred to as an entity-relationship graph, and may be expressed as a non-directed graph or a directed vector graph. In a non-directed graph, the distance between entities, either topological, spatial (e.g., the mathematical distance between the entity's coordinates), or both, may express information related to the relationship between those entities. In a directed vector graph, vectors connecting the entities in the coordinate space may also express information related to those entities.

For example, in some embodiments the distance between two entities in a coordinate space may represent the strength of the association between those two entities. In this example, if a first-degree entity is an author, and a second-degree entity is that author's employer, the second-degree entity may be referenced in most documents that list the first-degree entity, which may, in some embodiments, cause a cognitive computer system to conclude that the two entities are very strongly associated, and the two entities may thus be placed in close proximity in the coordinate space. Continuing the previous example, if a third entity is a commentator that publishes commentary on the author somewhat regularly, the commentator would also be a second-degree entity, and may be determined to be strongly, but not very strongly, associated with the author. If a fourth entity is also a commentator that publishes with regularity equal to that of the third entity, publishes commentary on the author's employer, rather than the author, the association between the first entity and the fourth entity may be of a medium strength. Finally, if a fifth entity is a second author at another employer that has been compared to the first entity in a single article by a sixth entity, the fifth entity may be determined to be weakly connected to the first entity.

In some embodiments the relationship information between entities may be expressed in a directed vector graph. In such embodiments, directional vectors between the entities may also express information about the relationships between the entities. In some embodiments, vectors may identify hierarchal information related to the relationship of the entities. For example, if a first entity were a blog poster and a second entity were providing commentary on the blog poster, a vector from the second entity may point to the first entity to express the direction of the relationship. Similarly, if the first entity were a company (e.g., Inoffensive Newspaper, LLC) and a second entity were the company's owner (e.g., Miss Anthrope), a vector from the second entity may point to the first entity to express the direction of the relationship.

In some embodiments the expression of the relationship between two entities may incorporate a measure of whether the relationship reflects positively or negatively on one of the entities. For example, if a first entity were criticized by a second entity, the strength of the relationship between the first and second entities may be regarded negatively. In a Euclidean coordinate space, a negative relationship may be expressed, in some embodiments, by positioning the discrete entity that is less topologically proximal to the first-degree entity (i.e., the "downstream" entity; e.g., the third-degree entity in a relationship between a second-degree entity and a third-degree entity) in a more negative direction in one or more of the three dimensions of the coordinate space. For example, if a third-degree entity spoke highly of a second-degree entity, that third-degree entity may be placed above the third degree entity (i.e., at a more positive value on the Y axis). This method could be applied in multiple types of coordinate spaces. For example, in coordinate spaces with more than 3 dimensions (e.g., a 5-dimension coordinate space), the third-degree entity may be placed in a more positive position, relative to the second-degree entity, in one of more of those dimensions (e.g., any combination of the first, second, third, fourth, and fifth dimensions).

In other embodiments, the positive and negative nature of a relationship may be expressed by the direction of a vector arrow in a directed vector graph. For example, in a positive relationship an arrow may point from the downstream entity (i.e., the entity that is less proximal, topologically, to the first-degree entity) towards the upstream entity (i.e., the entity that is more proximal, topologically, to the first-degree entity). In these embodiments, the relationship arrow may be separate from an arrow that represents a hierarchal relationship between the entities. In other embodiments, the relationship arrow may be in lieu of a hierarchal arrow.

It is important to note that in some embodiments the previously discussed graphical representation of entity relations may not actually be visually represented by a cognitive computing system that is analyzing relationship information between entities. Rather, the visual description of an entity-relationship graph may be utilized as a medium through which users may conceptualize the information that is expressible in the graph's coordinate space. However, in some embodiments a cognitive computer system may analyze entity-relationship information without plotting entities in a coordinate space visually.

For example, in some embodiments the association between any two entities may also be expressed numerically. In these embodiments, the strength of association between a first-degree entity and a second entity may be expressed as a number between (and including) 0.0 and 1.0, in which case 0.0 may represent no relationship and numbers close to 1.0 may represent an extremely close relationship. In such embodiments, a relationship of 1.0 may signify that the two entities are actually the same entity (e.g., a single company doing business as multiple different names, a single person publishing under multiple different pseudonyms).

In these embodiments the positive and negative nature of a relationship may also be expressible. As previously discussed, a first entity may be criticized by a second entity, and thus the strength of the relationship between the first and second entities may be regarded negatively. This negative regard may be appended to the information expressing the strength of the relationship. For example, if the first entity regularly criticized the second entity, a numerical expression of the relationship between the two entities may be −0.7. If the first entity regularly praised the second entity, the relationship between the two entities may be 0.7. If, on the other hand, the first entity occasionally praised the second entity, the relationship between the two entities may be 0.3.

In some embodiments, the analysis in block 108 may include preparing the relationship information that has been identified for the entities for further analysis by a neural network. For example, in some embodiments, entity-relationship information, such as the entity-relationship information that is expressible, for example, by an entity-relation graph or numerically, may be expressed in a multi-dimensional vector. Each dimension of such a vector may contain a numerical value that expresses some information about the relationship between a first-degree entity and other entities. In some embodiments, the information in some dimensions may include relationships between multiple discrete entities. In some embodiments, the information in some dimensions may include whether a relationship is positive or negative, and whether it reflects positively or negatively on the first-degree entity. In other embodiments, only basic association information may be included, such as information related to what entities are associated with other entities. In related embodiments, the strengths of those associations may also be included.

A vector, as used herein in relation to an input of a neural network (e.g., a feature vector), may refer to a matrix consisting of a single column or row of elements. The number of elements in the column or row is referred to herein as the "dimensions" of the vector. Some vectors are referred to as "numerical vectors." Numerical feature vectors may have, in each dimension (e.g., each element in the row or column), a number that expresses the data carried in that dimension. For example, some number vectors may express data in decimals between (and sometimes including) 0.00 and 1.00. Thus, a 5-dimension number vector may be represented as [0.53, 0.29, 0.00, 0.98, 0.02]. In this vector, each of those five numbers may express data about a different property of a document, an entity associated with that document, the relationships of the entities associated with that document, or others.

In these embodiments, the analysis in block 108 may involve inputting the multi-dimensional vector into a neural network that has been trained to analyze relationship information between entities to determine a likelihood that a first-degree document contains objectionable content. For example, the input layer of a deep neural network may take the form of a flat feature layer that is specialized to accept a multi-dimensional vector that expresses entity-relationship information, process the multi-dimensional vector, and pass the resulting values to subsequent hidden layers as the inputs to those layers. Those hidden layers may process those resulting values, passing the further resulting values to further subsequent hidden layers, until an output layer is reached.

At block 110, a cognitive computer system determines a likelihood that the candidate document of interest (i.e., the first-degree document obtained in block 102) contains objectionable content. This determination may be based on any combination of the analyses of relationship information discussed herein. For example, in some embodiments, deep-learning a neural network may process a multi-dimensional vector that expresses various entity-relationship information relating to a first-degree entity associated with the document of interest. That neural network may output a value that expresses the confidence that the first-degree document contains objectionable content. For example, an output value of 0.0 may represent a 0% confidence of objectionable content, whereas an output value of 1.0 may represent a 100% confidence of objectionable content. In other embodiments, two values may be output by the neural network: a first value that expresses a confidence that the first-degree document contains objectionable content, and a second value that expresses a confidence that the first degree document does not contain objectionable content. In some such embodiments, these two values may add up to 100% confidence (e.g., 1.0).

In some embodiments, block 110 may include a determination of whether to include a document of interest in a corpus. For example, in some embodiments a simple certainty threshold (e.g., a yes-no threshold) may be established, wherein any document with a certainty of objectionable content higher than the threshold value (or a certainty that the document does not contain objectionable content lower than the threshold value) would not be included in the corpus. For example, in some embodiments a value greater than 50% certainty of objectionable content may cause a document to be rejected from a corpus, whereas a value lower than 50% certainty of objectionable content may cause a document to be included in a corpus. In some embodiments, a more complex certainty threshold (e.g., a yes-maybe-no threshold) may be utilized. Such a threshold may increase accuracy and enable human reviewers to supervise and further train a neural network to identify the likelihood of objectionable content.

In some embodiments, the analysis of block 108 and categorization of block 110 may increase the accuracy with which a cognitive computer system may identify the likelihood of objectionable content beyond a categorization system that does not consider the implications of entity-relationship information. Recalling an earlier-discussed example, a system that performs content analysis of an article released by Inoffensive Newspaper, LLC may determine that the article content does not contain any offensive terms (e.g., profanity) and sentiment analysis may not identify negative sentiment or tone. Content analysis may even be performed on the data content surrounding the article, such as text titling the overall publication as "Inoffensive Newspaper." Such a system may therefore identify the overall publication as "inoffensive" based on the content surrounding the content of article.

Thus, such a system may select the article for a corpus. However, the article may actually contain offensive material if the overall message of the article, for example, devalues a group of people, devalues a group of beliefs, or advocates for positions considered reprehensible by social norms. If several such articles are inserted into a corpus to train an artificial-intelligence network, for example, that overall message may end up reflected in the core operations of the trained network, which may make the network unsuitable for its intended purpose. Further, this training on objectionable content may lead to embarrassing consequences if the existence of the objectionable content is not realized until after the network is deployed (e.g., in a continually trained neural network).

However, using the embodiments discussed herein, a cognitive computing system may identify Inoffensive Newspaper, LLC as an entity associated with the content of the article. Further, the cognitive computing system may also identify Miss Anthrope as strongly positively related to Inoffensive Newspaper, LLC. The cognitive computing system may identify other associations between Miss Anthrope other entities that suggest that an association with Miss Anthrope may increase a likelihood of objectionable content (in this case, offensive content). For example, Miss Anthrope may be frequently discussed in political commentaries by multiple discrete entities. In those political commentaries, Miss Anthrope may be described as a person who has a general dislike for most people, and whose publications tend to advocate for ideals that reflect that general dislike of people. This may be expressed as a negative relationship between the discrete entities and Miss Anthrope.

Further, if those multiple discrete entities are associated with many other discrete entities, and all the discrete entities together tend to share positive relationships, the negative relationships between the discrete entities and Miss Anthrope may be validated. Further still, if a strong positive association between Miss Anthrope and an offensive social activist, and negative relationships exist between the discrete entities and that activist, the negative relationships between Miss Anthrope and the discrete entities may be further validated. A cognitive computer system that is trained to analyze these entity relationships may identify a likelihood that content of the article in Inoffensive Newspaper may actually be offensive and reject it from a corpus.

As discussed, in some embodiments a cognitive computer system may reject or not reject a document from a corpus based on a simple threshold. However, in other embodiments, a more complex certainty threshold may be utilized. For example, in some embodiments any value greater than 70% certainty of objectionable content may cause a document to be rejected from a corpus, whereas any value lower than 20% certainty may cause a document to be included in a corpus. In such embodiments, values between 20% certainty and 70% certainty may cause a document to be flagged as potentially containing objectionable content. In some embodiments, documents flagged as potentially containing objectionable content may not be included in a corpus automatically, but may be categorized by human reviewers as containing or not containing objectionable content.

Figure 2:
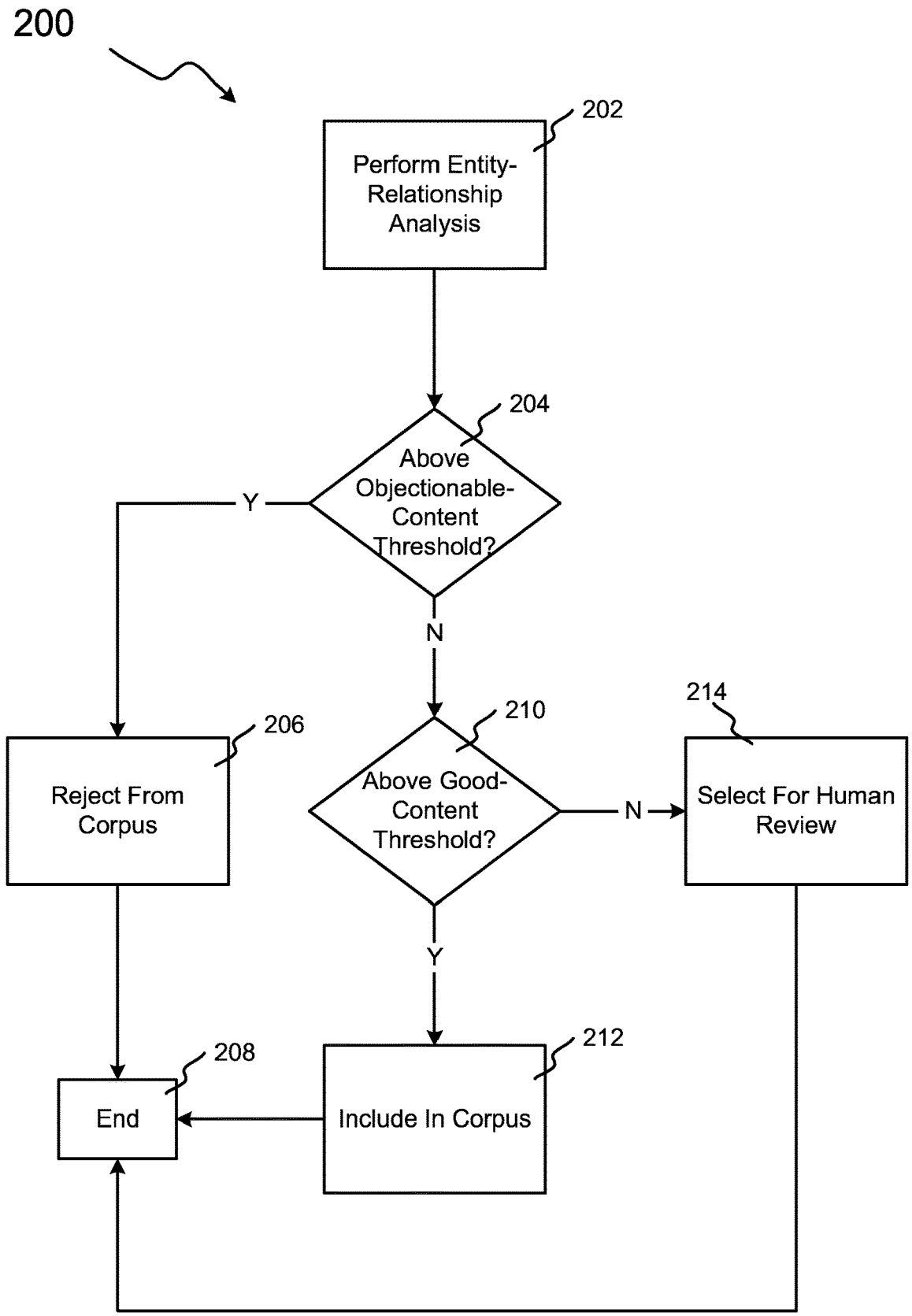
FIG. 2 depicts an example method of utilizing a complex certainty threshold, in accordance with embodiments.

Such an embodiment is disclosed by method 200 of FIG. 2. Method 200 begins with block 202, in which entity-relationship analysis is performed for at least one entity associated with a document. That entity-relationship analysis may output two numbers: a first certainty value that reflects the certainty that the document contains objectionable content, and a second certainty value that reflects the certainty that the document does not contain objectionable content (or, in other words, that it contains only "good" content). In block 204, the first certainty value is compared to an objectionable-content threshold. The objectionable-content threshold may be, for example, a threshold decimal number above which the first certainty value is considered to express sufficient certainty that a document contains objectionable content. If the first certainty value is above the threshold, the associated document is rejected from the corpus in block 206, and the method ends in 208.

If, on the other hand, the first certainty value is determined in block 204 to be below the objectionable-content threshold, the second certainty value is compared to a good-content threshold in block 210. This good-content threshold may be a number above which the second certainty value is considered to express sufficient certainty that the document does not contain objectionable content (or, in other words, that the document only contains "good" content). If the second certainty value is above the good-content threshold, the associated document is included in the corpus in 212, and the method ends in block 208.

If, on the other hand, the second certainty value is determined in block 210 to be below the good-content threshold, the document is selected for human review in block 214, after which the method may end in block 208. During human review, a human reviewer may either determine that the document does or does not contain objectionable content, and categorize (e.g., label) the content accordingly. Once the document is labeled, the human reviewer may also reject the document from or include the document in the corpus accordingly. In some embodiments, the human reviewer may alter the objectionable-content threshold or the good-content threshold Further, if the entity-relationship analysis in block 202 was performed by a neural network that is capable of continuous learning, the human reviewer may send the categorized document back through the neural network to help train the neural network categorize similar documents (e.g., as likely or unlikely to contain objectionable content) with higher certainty.

In some embodiments content analysis of a document may be utilized in addition to entity-relationship information when determining whether a first-degree document is likely to contain objectionable content. In some embodiments, content analysis may be considered during entity-relationship analysis, whereas in other embodiments it could be utilized to increase the confidence level of the outputs of entity-relationship analysis. In some embodiments the content analysis may be performed on the first-degree document, downstream documents (i.e., any document that may be relevant to the analysis but that is not the first-degree document), or both.

Analysis of the content of downstream documents may be useful, for example, when determining whether the relationships of entities associated with those downstream documents are positive or negative. For example, a second-degree entity may be strongly associated with a first-degree entity due to the second-degree entity releasing commentary that expresses skepticism about whether the first-degree entity is unbiased. Performing content analysis on the second-degree entity's commentary may clarify that the relationship between the second-degree entity and first-degree entity is negative.

As another example, a second-degree entity may be strongly associated with a first-degree entity, but no positive or negative value may be known regarding the relationship. However, a third-degree entity may release negative commentary regarding the second-degree entity, the content of which may be analyzed and attributed to the relationship between the third-degree entity and the second degree entity. In some embodiments that negative relationship may be attributed to the first-degree entity, and, in turn, the first-degree content. Several fourth-degree entities may also have released commentary on the third-degree entity (i.e., the fourth-degree commentary) that calls into question the validity of the third-degree entity's commentary on the second-degree entity (i.e., the third-degree commentary). In this example, content analysis of the fourth-degree commentary may be performed, at which point the value of the third-degree commentary may be reduced or eliminated, and, as a result, any effect of the third-degree commentary on the first-degree document may be discounted.

In some embodiments, content analysis of a first-degree document may also be combined with entity-relationship analysis. For example, in some embodiments entity-relationship analysis (with or without content analysis of downstream documents) may indicate that a first-degree entity has a very good reputation when writing about topic A, but is very unreliable when writing about topic B. In that case, performing content analysis (e.g., topic analysis) on the first-degree document may be helpful to determine whether the first-degree entity wrote the first-degree document about either topic A or topic B.

Figure 3:
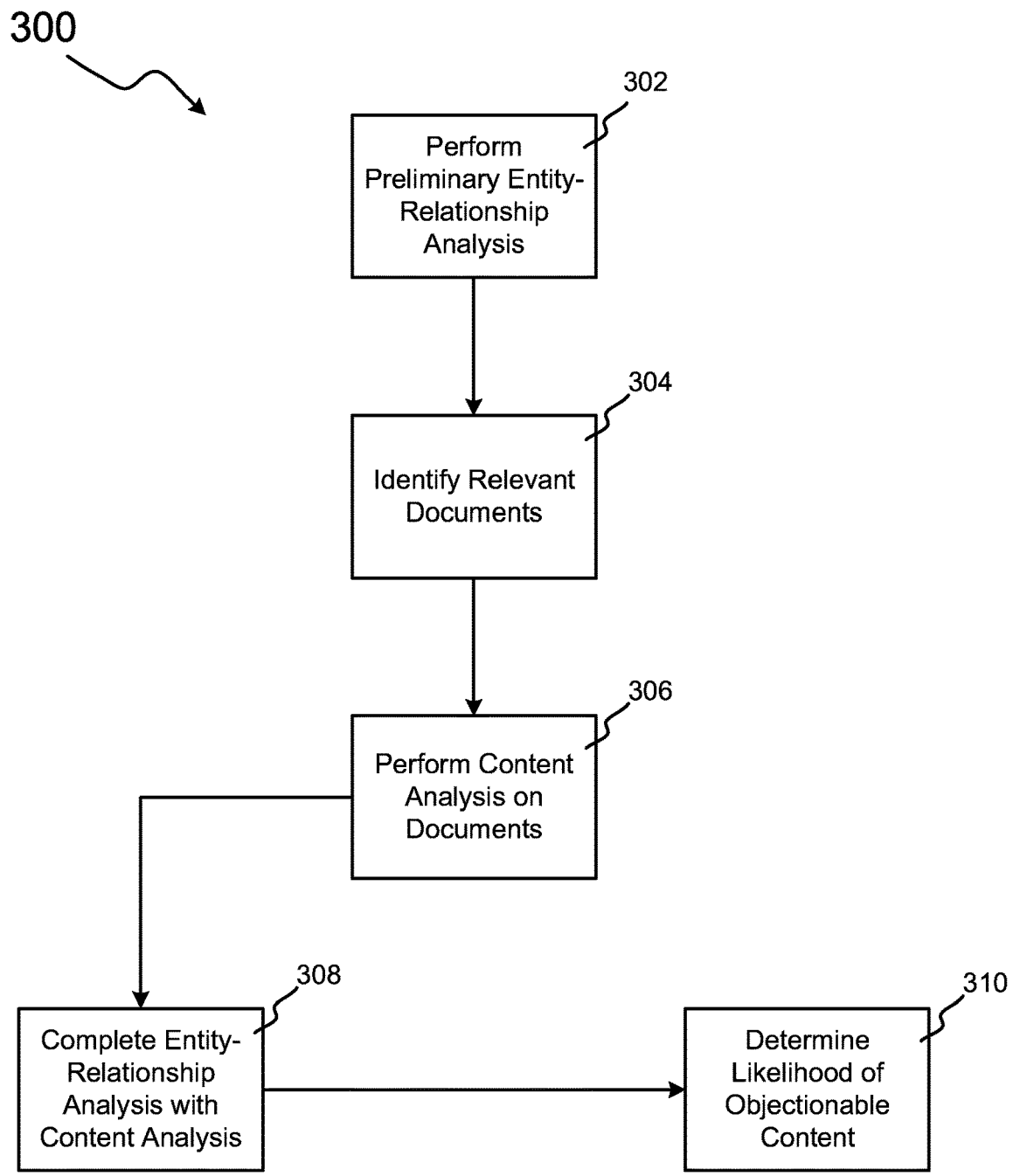
FIG. 3 depicts an example of a method in which content analysis may be utilized to improve the confidence with which a document is categorized, in accordance with embodiments.

FIG. 3 illustrates one example of a method 300 in which content analysis may be utilized to improve the confidence with which a document is categorized as likely to have or likely to not have objectionable content. Method 300 may be performed, for example, utilizing multiple decision pathways that may or may not be separate neural networks of varying complexity. In block 302, preliminary entity-relationship analysis is performed. In some embodiments, this may include obtaining a document of interest, identifying at least one entity associated with that document, and identifying the associations between that entity (or those entities) and other entities. In some embodiments, a preliminary categorization of a document may be performed based on the preliminary entity-relationship analysis. This preliminary categorization may be intended as a baseline level of confidence that the document contains objectionable content. The preliminary categorization may further be intended to be combined with/altered by content analysis that is performed as part of method 300.

In block 304, potentially relevant documents are identified. In some embodiments potentially relevant documents may be identified based on the entity relationships identified in block 302. For example, a web crawl for any documents with which identified entities are strongly associated (e.g., documents that the discrete entities own, authored, are sponsoring, etc.), may be performed.

Content analysis may then be performed on those documents in block 306. In some embodiments content analysis may include simple filters, such as filtering out documents that have no text or that are written in machine language or filtering out documents that contain certain keywords (e.g., profanity). In some embodiments, content analysis may include topic analysis, such as Latent Dirichlet Analysis or Latent Semantic Analysis, in which a list of probable topics for a document is created based on the presence of particular words used in that document. Topic analysis may also include term-frequency-inverse document frequency, which estimates how important a word in a document is to the document as a whole. In some embodiments content analysis may also include natural-language processing of the content of a document to process the meaning of the content. In some embodiments natural-language processing may include sentiment analysis, to identify documents with unusually negative sentiment. In some embodiments the natural-language processing may also attempt to identify offensive subject matter and biased content.

In some embodiments content analysis may also include temporal-relevance analysis. This temporal-relevance analysis may include analyzing the document for a publication date, a last-update date, or, on certain website formats, the date on which the website content was commented on most recently. In some embodiments temporal relevance may also utilize analysis of downstream documents. For example, a document that appears, based on analysis of the document's content, to be temporally irrelevant, may be classified as temporally relevant based on being cited or discussed in downstream documents recently.

In some embodiments, the content analysis performed in block 306 may be performed by several different specialized systems, such as decision engines and neural-network scorers. In other embodiments, content analysis may all be performed by a single neural network that is specialized to combine all inputs that may be related to the above-discussed analyses and process them to determine whether any content analysis may be relevant to the likelihood of objectionable content of a document.

Once content analysis is performed in block 306, entity-relationship analysis is completed in block 308, taking account of the outputs of the content analysis. In some embodiments, this may include filtering out first-degree documents (e.g., documents that contain no text) before relationship analysis is performed on the entities associated with those documents. In other embodiments, this may include using content analysis to increase the confidence of the conclusions of the relationship analysis (e.g., that entity A is strongly associated with entity B, or that entity C has a reputation among many entities as being a biased writer). In other embodiments, the entity-relation analysis may be completed and used to increase the confidence of the conclusions of the content analysis (e.g., that document 1 is likely to contain offensive content).

Upon completion of entity-relationship analysis in block 308, the likelihood of a document containing objectionable content is determined in block 310. In some embodiments, this determination may be performed by a neural network that is trained to output a value that signifies a confidence that the document contains objectionable content. In some such embodiments, the neural network may accept as inputs the output of the entity-relationship analysis. In some embodiments the neural network may also accept some outputs of the content analysis performed in block 306 as inputs. In other embodiments, the neural network may be an extension of, or part of, one or more of the neural networks discussed in connection with blocks 306 and 308.

In some embodiments, determination in block 210 may take the form of altering a preliminary categorization of the document that was performed after the preliminary entity-relationship analysis in block 302. This may enable refining the process by which the preliminary categorization is performed, improving the accuracy of the process. For example, in embodiments in which a neural network is performing the preliminary categorization, changes in the categorization at block 310 may be fed back through the neural network to improve the accuracy of the neural network.

Upon determining the likelihood of objectionable content in 310, a decision may be made regarding whether to include that document in a corpus. In some embodiments, such a decision may occur according to the methods discussed in connection with FIGS. 1 and 2.

As has been discussed previously, in some embodiments a deep-learning neural network may be configured to accept all information related to a document of interest and that may be relevant to whether the document of interest contains objectionable content. Such a neural network may be trained to process all the information at once. For example, a neural network may be specialized to accept the outcome of entity-relation analysis, and information related to topic filtration of a document, natural-language processing of a document, and temporal analysis of a document (e.g., what would be the inputs to these analyses) in the form of a single, multi-dimension feature vector. The neural network may process the multi-dimension feature vector through the feature and hidden layers, and be trained to determine, based on all relevant information in the feature vector, whether a document is likely to contain objectionable content.

As has also been discussed previously, such a neural network may process and analyze the multi-dimension vector by recognizing patterns in the data expressed by that vector and comparing those patterns to patterns related to documents on which the neural network has been trained. For example, a neural network may recognize several patterns in the data expressed by a feature vector for a particular document. The neural network may then associate some of those patterns with the patterns associated with documents that the neural network has been trained (e.g., by human-supervised training) to label as not containing objectionable content. However, the neural network may also associate some of those patterns with the patterns associated with documents that the neural network has been trained to label as containing objectionable content. The neural network may then analyze all these patterns and, based on that analysis, label that particular document as likely or unlikely to contain objectionable content.

In some embodiments the content of the multi-dimension vector may express data relating to several data types. For example, as previously discussed, this vector may include data related to entity relationships, topic analysis, natural-language processing, and temporal analysis related to a document and other documents associated with that document. In other embodiments, the multi-dimension vector may express data related to a single data type. For example, the vector may include only data related to entity-relationships (e.g., the entities associated with a document, the entities associated with those entities, the entities associated with those further entities, and so on).

Figure 4:
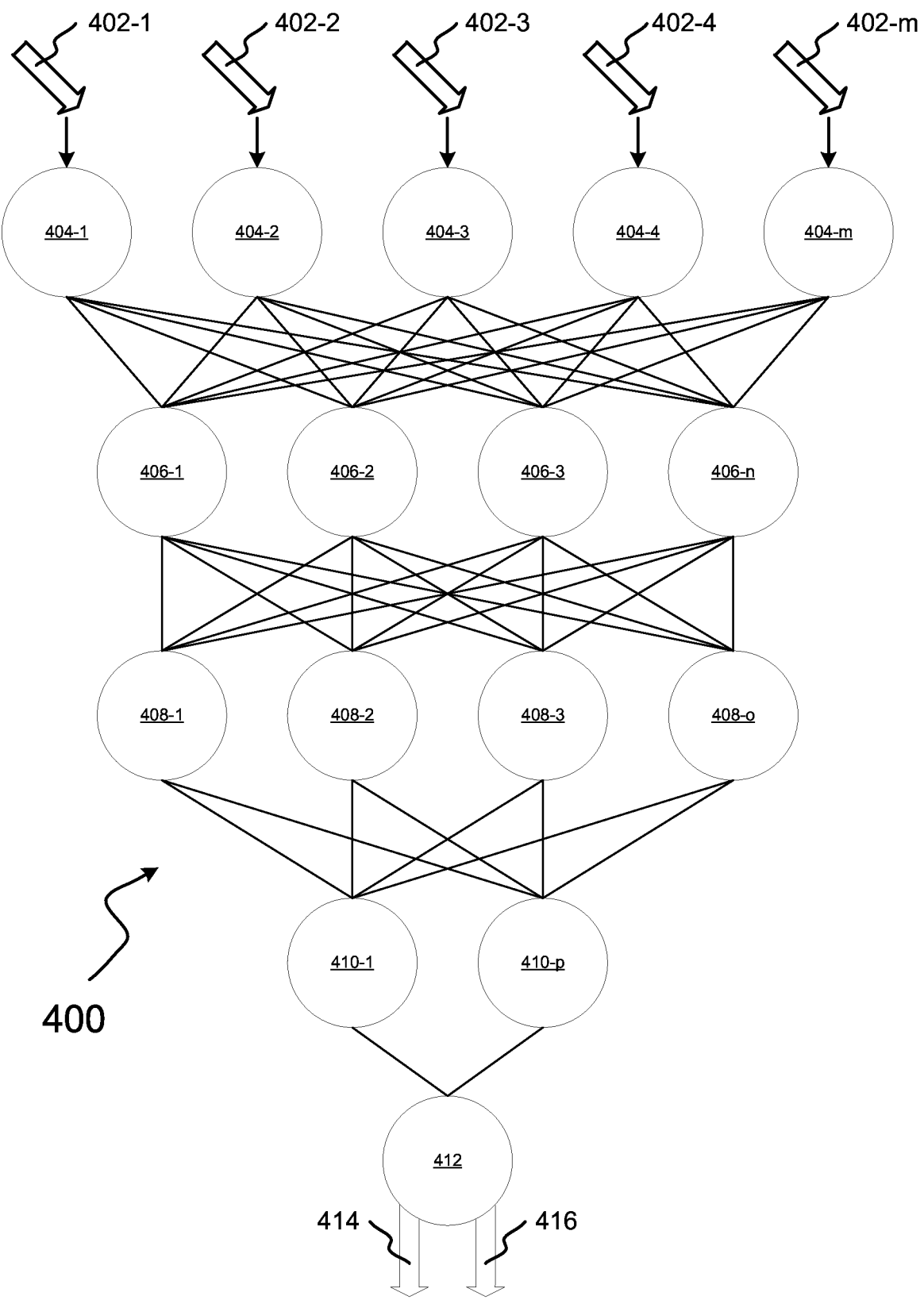
FIG. 4 depicts an example neural network that may be specialized in categorizing the content of a document based on entity-relationship information, in accordance with embodiments.

Such a neural network is illustrated in FIG. 4. In FIG. 4, neural network 400 may be trained to determine a confidence value that expresses a likelihood that a document contains objectionable content. The inputs of neural network 400 are represented by feature vectors 402-1 through 402-*m*. These feature vectors may contain all information that is available regarding the document, including entity-relationship information of at least one entity that is associated with that document. In some embodiments, feature vectors 402-1 through 402-*m* may be identical copies of each other. In some embodiments, more of instances of feature vectors 402 may be utilized. The number of feature vectors 402-1 through 402-*m* may correspond to the number of neurons in feature layer 404. In other words, in some embodiments, the number of inputs 402-1 through 402-*m* (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-*m* may equal the number of first-layer neurons in the network minus the number of first-layer bias neurons.

Feature layer 404 contains neurons 401-1 through 401-*m*. Neurons 404-1 through 404-*m* accept as inputs feature vectors 402-1 through 402-*m* and process the information therein. Once vectors 402-1 through 402-*m* are processed, neurons 404-1 through 404-*m* provide the resulting values to the neurons in hidden layer 406. These neurons, 406-1 through 406-*n*, further process the information, and pass the resulting values to the neurons in hidden layer 408. Similarly, neurons 408-1 through 408-*o* further process the information and pass it to neurons 410-1 through 410-*p*. Neurons 410-1 thorough 410-*p* process the data and deliver it to the output layer of the neural network, which, as illustrated, contains neuron 412. Neuron 412 may be trained to calculate two values—value 414 and value 416. Value 414 may represent the likelihood that the document being analyzed contains objectionable content. Value 416, on the other hand, may represent the likelihood that the document does not contain objectionable content.

In some embodiments, neural network 400 may have more than 5 layers of neurons (as presented) or fewer than 5 layers. These 5 layers may each comprise the same amount of neurons as any other layer, more neurons than any other layer, fewer neurons than any other layer, or more neurons than some layers and fewer neurons than other layers. Finally, in some embodiments, the output of output layer 412 may be used to determine whether to include a document in a corpus based on the likelihood of objectionable content in the document.

Figure 5:
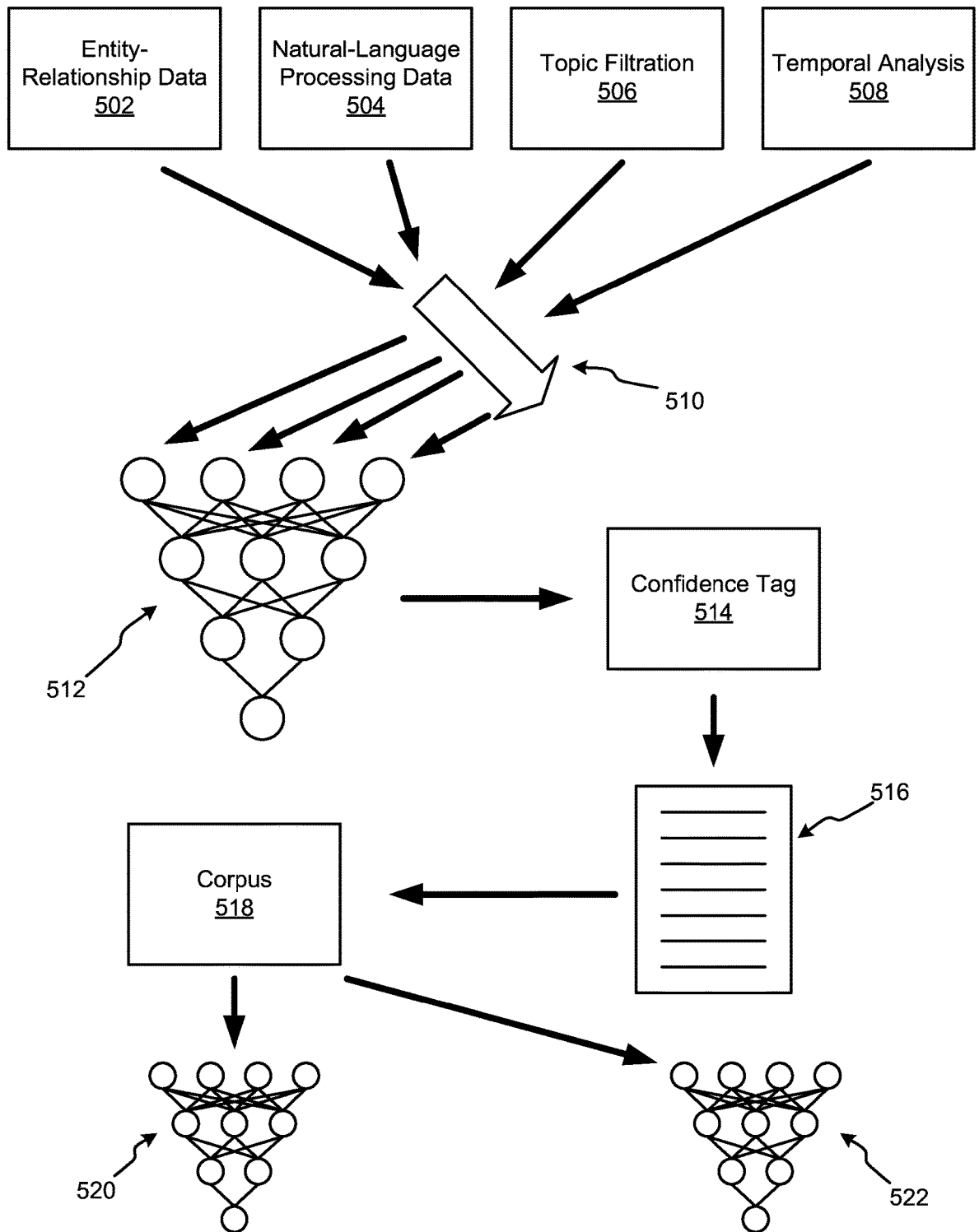
FIG. 5 illustrates an example flow diagram in which a corpus is prepared using a document identified as unlikely to contain objectionable content using entity-relationship analysis, in accordance with embodiments.

FIG. 5 illustrates an example flow diagram in which a corpus is prepared using a document identified as unlikely to contain objectionable content using entity-relationship analysis. In the diagram, entity-relationship data 502, natural-language-processing data 504, topic filtration 506, and temporal analysis 508 represent the available information pertaining to document 516. Inputs 502-508 are converted into feature vector 510, a multi-dimension vector. In some embodiments, feature vector 510 may be a numerical vector.

An instance of feature vector 510 is input the feature layer (also referred to as the input layer) of neural network 512. In some embodiments, an identical instance is input into each neuron in the feature layer of neural network 512. Neural network 512 may be a deep-learning neural network that has been trained to recognize patterns in data associated with document 516 (e.g., patterns in the entity-relationships associated with the document) and classify document 516 as either likely to contain objectionable content or not likely to contain objectionable content based on those patterns.

Neural network 512 classifies a document 516 by outputting a number 514 (referred to herein as a "confidence tag") that corresponds to a confidence that document 516 contains objectionable content. For example, if 0 represents complete confidence that document 516 contains objectionable content, and 10 represents complete confidence that document 516 contains objectionable content, a score of 7.5 may represent 25% confidence that document 516 contains objectionable content. Document 516 is then tagged based on whether the confidence classification is above a confidence threshold. For example, if the threshold were 40% confident that the document contains objectionable content, a 45% confidence may result in document 516 being tagged as "likely to contain objectionable content," whereas a 35% confidence may result in document 516 being tagged as "not likely to contain objectionable content.

Document 516 is determined to be unlikely to contain objectionable content, and is thus added to corpus 518. Corpus 518 may then be used for several purposes. For example, neural networks 520 and 522 could analyze the documents of corpus 518 as part of unsupervised network training. For example, neural network 520 may be a question-and-answer neural network, that accepts questions entered by human users, parses them, and attempts to answer them using natural-language generation. Because corpus 518 may be less likely to contain objectionable content after being processed by neural network 512, network 520 may be less likely to compose answers with offensive content than when using a corpus that has not been processed similarly.

Figure 6:
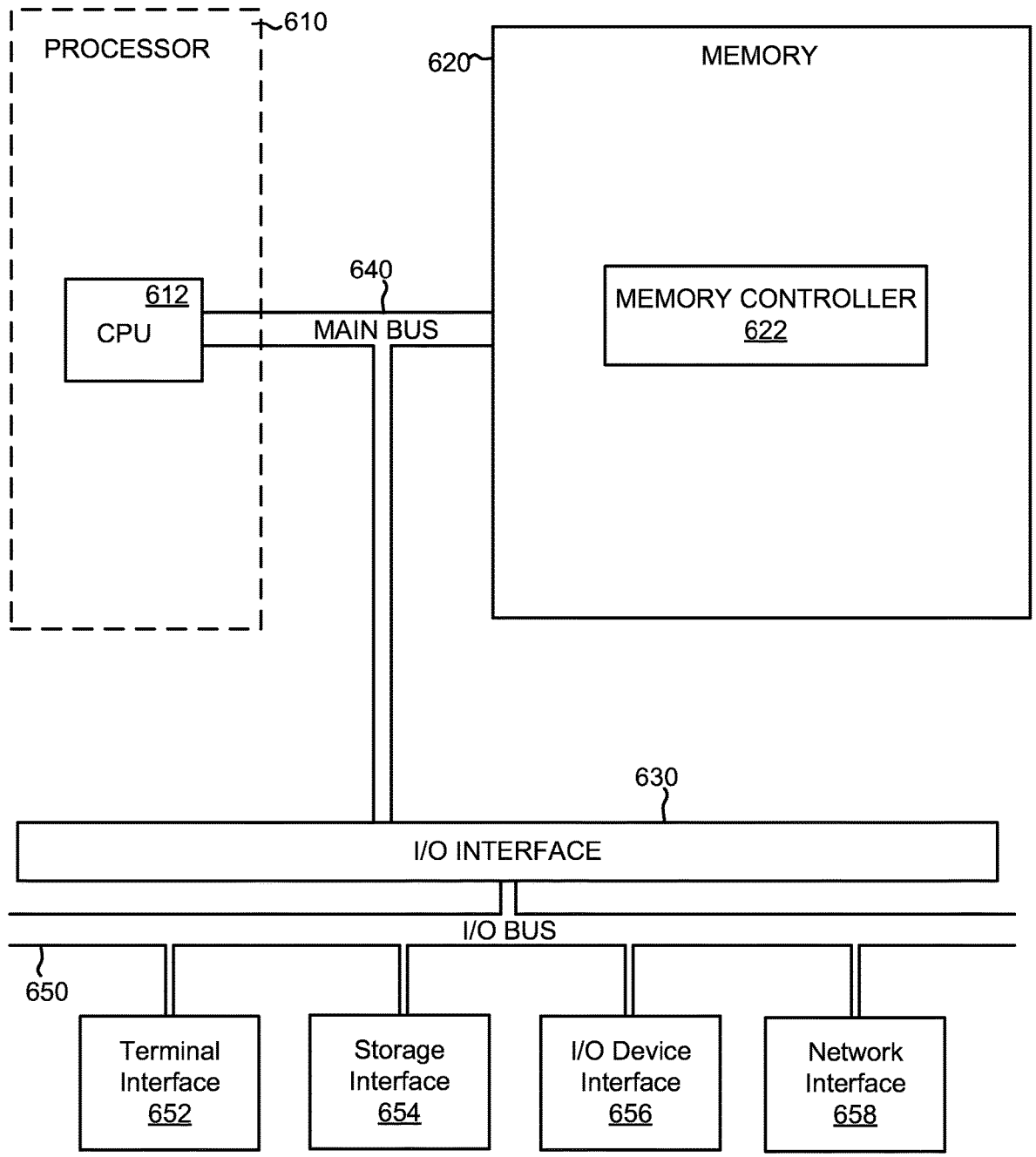
FIG. 6 depicts the representative major components of a computer system that may be used in accordance with embodiments.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    obtaining a document of written content, wherein the document is a candidate for inclusion in a corpus;
    identifying a first entity associated with the document;
    identifying a first discrete entity associated with the first entity;
    analyzing a relationship between the first entity and the first discrete entity, wherein the analyzing comprises vectorizing entity-relationship information related to the first entity and processing the vectorized information in a neural network;

determining, based on the analyzing, a likelihood that the document contains content that would be detrimental for inclusion in the corpus; and rejecting, based on the analyzing and the likelihood, the document from the corpus.

2. The method of claim 1, wherein the first entity is an author of the document.

3. The method of claim 1, wherein the first discrete entity is associated with the first entity based on an association of the first entity and the first discrete entity with a second discrete entity.

4. The method of claim 1, wherein the analyzing incorporates content analysis of the document.

5. The method of claim 1, wherein the analyzing comprises determining the strength of the relationship.

6. The method of claim 1, further comprising attaching a negative value to the relationship, wherein a negative value reflects a negative sentiment between the first entity and the first discrete entity.

7. A computer program product, the computer program product comprising a computer readable storage medium having program instructions embodied therewith, the program instructions executable by a computer to cause the computer to:

obtain a document of written content, wherein the document is a candidate for inclusion in a corpus;

identify a first entity associated with the document;

identify a first discrete entity associated with the first entity;

analyze a relationship between the first entity and the first discrete entity, wherein the analyzing comprises vectorizing entity-relationship information related to the first entity and processing the vectorized information in a neural network;

determine, based on the analyzing, a likelihood that the document contains content that would be detrimental for inclusion in the corpus; and include, based on the analyzing and the likelihood, the document in the corpus.

8. The computer program product of claim 7, wherein the first entity is an owner of a website on which the document is posted.

9. The computer program product of claim 7, wherein the first discrete entity is associated with the first entity based on an association of the first entity and the first discrete entity with a second discrete entity.

10. The computer program product of claim 7, wherein the analyzing incorporates content analysis of the document.

11. The computer program product of claim 7, wherein the analyzing comprises determining the strength of the relationship.

12. The computer program product of claim 7, wherein the program instructions further cause the computer to attach a negative value to the relationship, wherein a negative value reflects a negative sentiment between the first entity and the first discrete entity.

13. A system comprising:

a processor; and a memory in communication with the processor, the memory containing program instructions that, when executed by the processor, are configured to cause the processor to perform a method, the method comprising:

obtaining a document of written content, wherein the document is a candidate for inclusion in a corpus;

identifying a first entity associated with the document;

identifying a first discrete entity associated with the first entity;

analyzing a relationship between the first entity and the first discrete entity, wherein the analyzing comprises vectorizing entity-relationship information related to the first entity and processing the vectorized information in a neural network;

determining, based on the analyzing, a likelihood that the document contains content that would be detrimental for inclusion in the corpus; and including, based on the analyzing and the likelihood, the document in the corpus.

14. The system of claim 13, wherein the first entity is an owner of the document.

15. The system of claim 13, wherein the first discrete entity is associated with the first entity based on an association of the first entity and the first discrete entity with a second discrete entity.

16. The system of claim 13, wherein the analyzing comprises determining the strength of the relationship.

17. The system of claim 13, where the method further comprises attaching a negative value to the relationship, wherein a negative value reflects a negative sentiment between the first entity and the first discrete entity.

* * * * *